(12) United States Patent
Cummings et al.

(10) Patent No.: US 8,014,413 B2
(45) Date of Patent: Sep. 6, 2011

(54) SHARED INPUT-OUTPUT DEVICE

(75) Inventors: Gregory D. Cummings, Portland, OR (US); Luke Chang, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1409 days.

(21) Appl. No.: 11/467,895

(22) Filed: Aug. 28, 2006

(65) Prior Publication Data

US 2008/0123676 A1    May 29, 2008

(51) Int. Cl.
*H04L 12/28* (2006.01)
*H04L 12/66* (2006.01)
*H04L 12/56* (2006.01)
*H04Q 11/00* (2006.01)

(52) U.S. Cl. ......... 370/419; 370/359; 370/412; 370/463
(58) Field of Classification Search .......... 370/359, 370/389, 392, 412, 415, 419, 463
See application file for complete search history.

(56) References Cited

U.S. PATENT DOCUMENTS

| | | | |
|---|---|---|---|
| 7,227,842 B1 * | 6/2007 | Ji et al. | 370/235 |
| 7,474,668 B2 * | 1/2009 | Bauman et al. | 370/412 |
| 7,733,795 B2 * | 6/2010 | Johnson et al. | 370/252 |
| 7,768,959 B1 * | 8/2010 | Chen et al. | 370/328 |
| 7,835,380 B1 * | 11/2010 | Aloni et al. | 370/419 |
| 2005/0138620 A1 * | 6/2005 | Lewites | 718/1 |
| 2006/0045089 A1 * | 3/2006 | Bacher et al. | 370/392 |
| 2007/0183418 A1 * | 8/2007 | Riddoch et al. | 370/389 |
| 2008/0002703 A1 * | 1/2008 | Tripathi et al. | 370/392 |
| 2008/0008141 A1 * | 1/2008 | Tchigevsky et al. | 370/338 |
| 2008/0043765 A1 * | 2/2008 | Belgaied et al. | 370/409 |

OTHER PUBLICATIONS

Neterion, Inc., "Neterion Xframe® E," 2006, http://www.neterion.com/products/xframeE.html, 5 pgs.

* cited by examiner

*Primary Examiner* — Warner Wong
(74) *Attorney, Agent, or Firm* — Schwabe, Williamson & Wyatt, P.C.

(57) ABSTRACT

In some embodiments, a shared IO device includes a plurality of packet filters associated with a plurality of virtual systems sharing the shared I/O device and a plurality of filter receive queues assigned to the plurality of packet filters. A processor is responsive to a receive packet to determine if the receive packet matches one of the plurality of packet filters and the processor, upon determining that there is a matched packet filter, is adapted to place the receive packet in the filter receive queue assigned to the matched packet filter.

20 Claims, 13 Drawing Sheets

SHARED INPUT-OUTPUT DEVICE

BACKGROUND

1. Technical Field

Embodiments of the present invention are related to the field of electronic devices, and in particular, to shared IO devices.

2. Description of Related Art

A virtual environment is capable of supporting multiple virtual machines (VMs) simultaneously, with each VM running its own guest operating system and guest application software. Each operating system controls and manages a set of virtualized hardware resources, which may include storage resources, and peripheral devices needed to perform input and output (I/O) for the virtual system. Real resources of the host platform in the virtual environment are shared among the VMs, with a layer of virtualizing software, such as a virtual machine monitor (VMM), managing the allocation of, and access to, the hardware resources of the host platform. The virtualizing software controls the real system resources and makes them available to the guest operating systems that alternately execute on the same hardware.

The virtualizing software may include a Virtual Bridge/Switch (VBS), which separates network traffic and forwards it to the appropriate destination. The VBS may be transparent to its communication partners. To achieve "transparency", the interfaces of the VBS may be configured in a promiscuous mode, which allows the interfaces of the VBS to receive incoming packets destined to any MAC address. The VBS inspects each packet's destination address, and using VBS filters, decides whether a packet should be forward to another interface or dropped. When in the VBS promiscuous mode, each packet is processed in a serialized manner, because the VBS assumes the worst case—that the incoming stream of packets is made up of packets to be forwarded to different VMs.

VBS allows virtual systems to transmit packets to an external network. A packet that is targeted to an external host may be forward to a VBS interface connected to the network adapter. Many network adapters have only single transmit queue. This can be problematic when several virtual systems are sharing the network adapter. For example, if a virtual system transmits a packet, its transmission may have to wait for previously queued transmit packets generated by other virtual systems to drain from the single transmit queue of the network adapter. This is commonly referred to as "head of line blocking".

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention. The term "coupled" shall encompass a direct connection, an indirect connection or an indirect communication.

Figure 1:
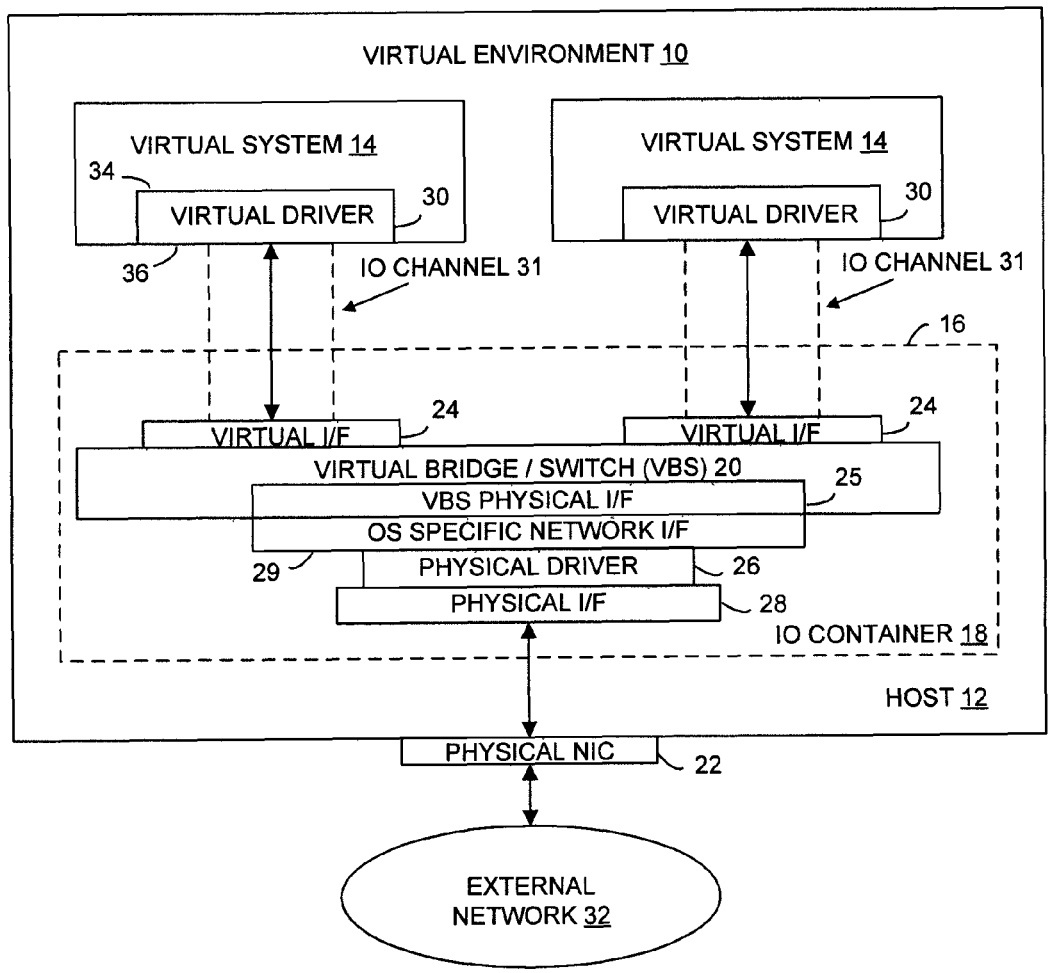
FIG. 1 is a generalized virtual environment, according to some embodiments of the present invention.

With reference to FIG. 1, there is illustrated a virtual environment 10 implemented in a single host computer 12, according to some embodiments of the present invention. The host computer 12 may also be referred to as a host platform or host machine. In some embodiments, the virtual environment 10 may support multiple virtual systems 14 simultaneously on the host computer 12, with each virtual system 14 having its own execution environment. For the purposes of illustration, two virtual systems 14 are illustrated.

When a system (or subsystem), e.g., a memory or input/output (I/O) device (e.g., network adapter) is virtualized, its virtual interface and all the resources visible through the virtual interface are mapped onto the real interfaces and resources of the host computer 12. Virtualizing software 16 manages the virtual resources and physical resources of the host hardware computer 12. In other words, a combination of the underlying real hardware of the host computer 12 and the virtualizing software 16 defines a virtual machine (VM) which provides an execution environment.

In some embodiments, the virtual system 14 may include (1) a guest operating system, (2) the one or more guest application programs, and (3) a system VM which provides an illusion of a complete system with an execution environment for running the guest operating system and the one or more guest application programs. For example, with the system VM, the virtualizing software 16 may be placed on top of the instruction set architecture (ISA) interface. In other embodiments, the virtual system 14 may include (1) one or more guest processes and (2) a process VM which provides an execution environment capable of supporting the one or more guest processes. For example, with the process VM, the virtualizing software 16 may be placed at the application binary interface (ABI) interface, which is on top of the host OS/hardware combination.

In some embodiments, the execution environments of the virtual systems 14 may be the same, e.g., replicated virtual systems 14. In some embodiments, the execution environments of the virtual systems 14 may each emulate the underlying host hardware of the host computer 12. In other embodiments, the execution environments of the virtual systems 14 may be different between virtual systems 14 and/or may differ from the execution environment of the underlying host computer 12. In some embodiments having system VMs, the guest operating systems may be the same or they may be different.

In some embodiments, the virtualizing software 16 may include an IO (input-output) container/sub-system 18, which will be referred to as the "IO container 18". In some embodiments, the virtualization software 16 may be characterized as including a Virtual Machine Monitor (VMM), which is not shown in FIG. 1. In those embodiments where the virtualizing software 16 may be characterized as a VMM, the VMM may include the IO container 18 (see FIG. 9) or the VMM and the IO container 18 may be separate from each other (see FIG. 10).

The IO container 18 may include a Virtual Bridge/Switch (VBS) 20 to provide a switching function for multiple virtual systems 14. The virtual environment 10 may also include one or more shared IO device, such as a shared network adapter 22. In general, the IO container 18 may provide mechanisms to support any shared IO device, such as the physical network adapter 22. In virtualizing the host computer 12 to generate multiple VMs for multiple virtual systems 14, the network adapter 22 also may be virtualized so as be referred to as a virtualized machine device (VMD). In one illustrative embodiment, the network adapter 22 may be a local area network (LAN) adapter or a network interface card (NIC). In general, in the virtual environment 10 some of the switching functions of the VBS 20 are offloaded to the network adapter 22, so as to reduce the computational overhead of the VBS 20, as will be described hereinafter.

The virtual environment 10, according to some embodiments of the present invention, may include an IO device sharing architecture which provides offloading of the task of packet sorting from the VBS 20 to the network adapter 22, as will be described with respect to FIGS. 1-4. In some embodiments, the network adapter 22 may be characterized as a VMM vendor which extends its IO device sharing architecture to support offloading of the VBS 20 by pre-sorting receive packets. In some embodiments, the network adapter 22 also may undertake a hardware assisted method for receive packets to be process through the VBS 20 in groups of packets instead of one packet at a time.

Figure 5:
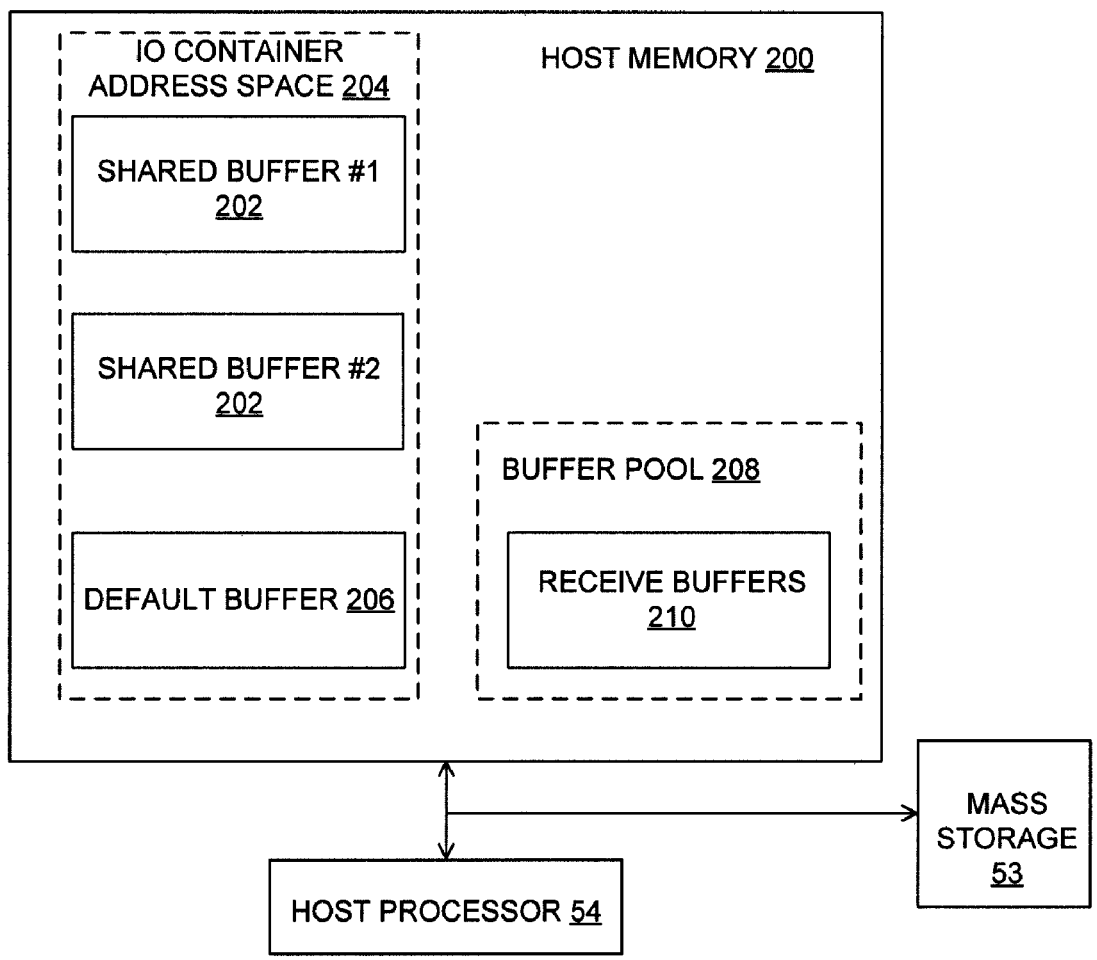
FIG. 5 is a diagram of another configuration of the host memory subsystem of a host computer in the virtual environment of FIG. 1, according to some embodiments of the present invention.

The virtual environment 10, according to some embodiments of the present invention, may include an IO device sharing architecture which uses a software method (referred to as "direct DMA", where DMA stands for Direct Memory Access) in which the receive packets may be placed directly into a shared buffer, as will be described with respect to FIGS. 1 and 5-6. This software method may use shared buffers, which are shared by IO container 18 and the virtual system 14.

The virtual environment 10, according to some embodiments of the present invention, may include an IO device sharing architecture which uses a hardware method to support "transmit fairness", as will be described with respect to FIGS. 1 and 7-8. In the network adapter 22, there may be pairs of transmit and receive queues assigned to each filter.

Figure 9:
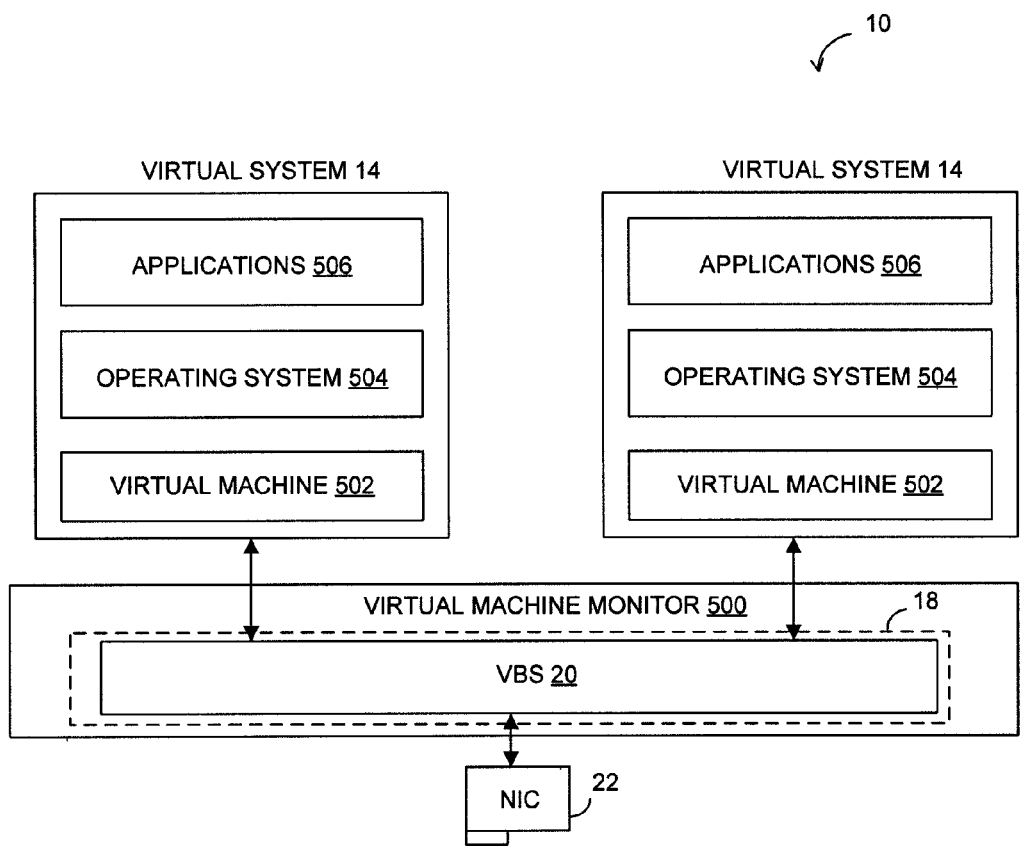
FIG. 9 is the virtual environment of FIG. 1 with one configuration of a VMM, according to some embodiments of the present invention.

The IO container 18 is a software construct that allows physical devices, such as the network adaptor 22, to be shared among multiple virtual systems 14. In some embodiments, the IO container 18 may be part of a de-privileged operating system (OS) running in a specialized virtual subsystem, as will be described in FIG. 10. In some embodiments, the IO container 18 may be an IO subsystem whose components are characteristically integrated into a VMM or hypervisor and are not part of a specialized virtual subsystem, as illustrated in FIG. 9. The term "IO container" 18 is intended to cover both of these embodiments.

The VBS 20 of the IO container 18 may include a virtual interface 24 for each of the virtual systems 14 and a physical interface 25. Additionally, the IO container 18 may include a physical device driver 26 (software driver) having a lower physical interface 28 and an upper OS specific receive network interface 29, which will be referred to as the "OS specific interface" 29. Each of the virtual systems 14 may include a virtual driver 30. Each of the virtual drivers 30 may be coupled to one of the virtual interfaces 24 by way of an IO channel 31. The network adapter 22 may couple the host computer 12 to an external network 32. The external network 32 may be a local, metropolitan or wide area computer network; and may be a home network, an intranet or the Internet. As one illustrative example, the network adapter 22 may be described as an Ethernet adapter, which communicates with the external network 32, which is an Ethernet external network. In some embodiments, the IO container 18 may provide a virtualized network infrastructure that is transparent to operating systems and application software of the virtual systems 14. In some embodiments, the application software may include network applications. In some embodiments, this may allow network applications to run unchanged in the virtual environment 10 as if they were running in a non-virtualized environment.

The network adapter 22 may communicate with the IO container 18 by way of the physical interface 28. By binding one of the virtual interfaces 24 to each of the virtual systems 14, IO services may be provided to the virtual systems 14. The IO container 18 may route IO events between one or more of the virtual interfaces 24 and the physical interface 28. In some embodiments, IO events also may be routed between virtual interfaces 24.

The IO container 18 uses the VBS 20 to share the physical network adapter 22 between the virtual systems 14; hence, the network adapter 22 may be referred to as a shared IO device or shared network adapter. Correspondingly, the sharing of a physical network adapter 22 with the multiple virtual interfaces 24 may be accomplished by the VBS 20.

In some embodiments, the VBS 20 may be a software implementation of a network interface layer (Layer 2) bridge/switch. In other words, the VBS 20 may interconnect the virtual and physical interfaces 24 and 28 at the network interface layer and forwards frames between them. In some embodiments, the VBS 20 may act as a (Media Access Control) MAC relay and may be independent of any upper protocols (protocols above Layer 2). More specifically, the VBS 20 may be "transparent" to the Internet Protocol (IP) layer. For example, when a host computer 12 sends a packet or data frame (e.g., Ethernet frame) over the external network 32 to another targeted host computer 12 having another VBS 20, then the host computer 12 sends a frame directly to the targeted host computer 12 over the network 32 and the frame "crosses" the VBS 20 without the awareness of the sending or receiving host computers 12. The various referred to layers may be in accordance with the Open Systems Interconnect (OSI) model.

The virtual interfaces 24 may be added to the VBS 20 when the associated virtual systems 14 are created. Each of the virtual interfaces 24 then may be bound to its corresponding virtual driver 30 of the one of the virtual systems 14. Once bound together, the virtual system 14 is able to send and receive packets or data frames to and from the VBS 20. In some embodiments, the virtual interface 24 may be viewed as communicating with the virtual driver 30 by means of a VMM specific software mechanism. Generally, at least two virtual systems 14 may be included so as to justify the inclusion of the VBS 20. Although only two virtual systems 14 are shown, more virtual systems 14 may be included.

The physical interface 25 of the VBS 20 may be bound to physical device driver 26 of the IO container 18. In some embodiments, the physical device driver 26 may be compliant with the operating system of the IO container 18. The VBS 20 generally may be part of the operating system of the IO container 18, which allows binding to physical devices. Additional physical device drivers 26 and physical interfaces 28 may be included in the IO container 18 for additional IO devices.

Each of the virtual drivers 30 may have an upper interface 34 and a lower interface 36. The upper interface 34 may be a standard OS specific network driver interface. This allows a guest OS of one of the virtual systems 14 to send and receive packets (data frames) through the virtual driver 30 in the same manner as a non-virtualized driver. The lower interface 36 may be connected to a VMM specific device independent IO channel 31, which is sometimes referred to as "device channel" or "virtual bus". This interface 36 may replaces a non-virtualized driver hardware interface. In an illustrated Ethernet implementation, each of the virtual drivers 30 may be a pseudo Ethernet driver.

The physical device driver 26, which may be located in the IO container 18, controls the network adapter 22. In some embodiments, the physical device driver 26 may be OS specific driver for the IO container 18 that receives and sends data frames or packets. The physical device driver 26 may interface with the network adapter 22 to initialize the device; control resets, interrupts, and provides power management. In some embodiments, the physical device driver 26 may be loaded after the VMM (not shown in FIG. 1) directly exposes the network adapter 22 to the IO container 18. An example of such a physical device driver 26 may be a Network Driver Interface Specification (NDIS) miniport under the Microsoft operating system and a link driver in Linux. The upper OS specific interface 29 of the physical device driver 26 may be added to the VBS 20 to allow access of the external network 32. In an illustrative Ethernet implementation, the physical device driver 26 may be an OS specific Ethernet driver that receives and sends Ethernet frames (packets).

With respect to FIG. 1, the virtual environment 10, according to various embodiments of the present invention, provides an architecture wherein there may be IO device sharing between multiple virtual systems 14. For example, the shared IO device may be a network device, such as the network adapter 22. As will be described hereinafter, the shared IO device, in the virtual environment 10, may provide for offloading of overheads of the VBS 20 by using filtering capabilities. Moreover, the shared IO device may leverage the network architecture of the IO container 18 to reduce software changes in both the physical device driver 26 and the IO container 18 software.

As previously described, the VBS interfaces 24 and 25 may connect to physical devices (e.g., network adapter 22) and/or virtual devices (e.g., virtual drivers 30), respectively. VBS virtual interfaces 24 connected to virtual devices (virtual drivers 30) may provide mechanisms that allow forwarded data frames to be directly/indirectly placed (via page flipping, page sharing, or CPU copy) into a buffer of the virtual driver 30 located in a particular virtual system 14 address space. This amounts to "sending" the forwarded packet from the VBS 20 to a targeted virtual system 14. The data frame may be from another virtual system 14 or from the external network 32 via the physical network adapter 22. In some embodiments, where the network adapter 22 has limited resources, the VBS 20 may still handle the switching for configurations that exceed the limits of the network adapter 22.

As previously described, the IO container 18 may allow a single physical device, e.g., network adapter 22, to be shared by multiple virtual systems 14. The implementation of the IO container 18 may add additional overheads to both receive and transmit paths. In the virtual environment 10, according to various embodiments of the present invention, offloading some of the most commonly repeated tasks of the IO container 18 may be undertaken. More specifically, the overhead of the IO container 18 may be reduced by offloading some of the tasks to the shared network adapter 22. This offloading of tasks may improve the performance of the IO container 18 and may allow the IO container 18 to handle tasks for which less benefit would be obtained in off loading them. An example of a task that may be retained by the IO container 18 may be broadcast/multicast replication.

With reference to FIGS. 1-4, offloading of the pre-sorting of packets from the IO container 18 to the network adapter 22 will now be described. As previously mentioned, the process of virtualization includes mapping of the virtual resources or state (e.g., registers, memory, or files) to real resources in the host computer 12 and the use of real machine instructions and/or system calls to carry out the actions specified by virtual machine instructions and/or system calls. To assist in the visualization of this mapping, generalized memories of the host computer 12 and the network adapter 22 will be described, along with flow charts showing the operation of the virtual environment 10.

Figure 2:
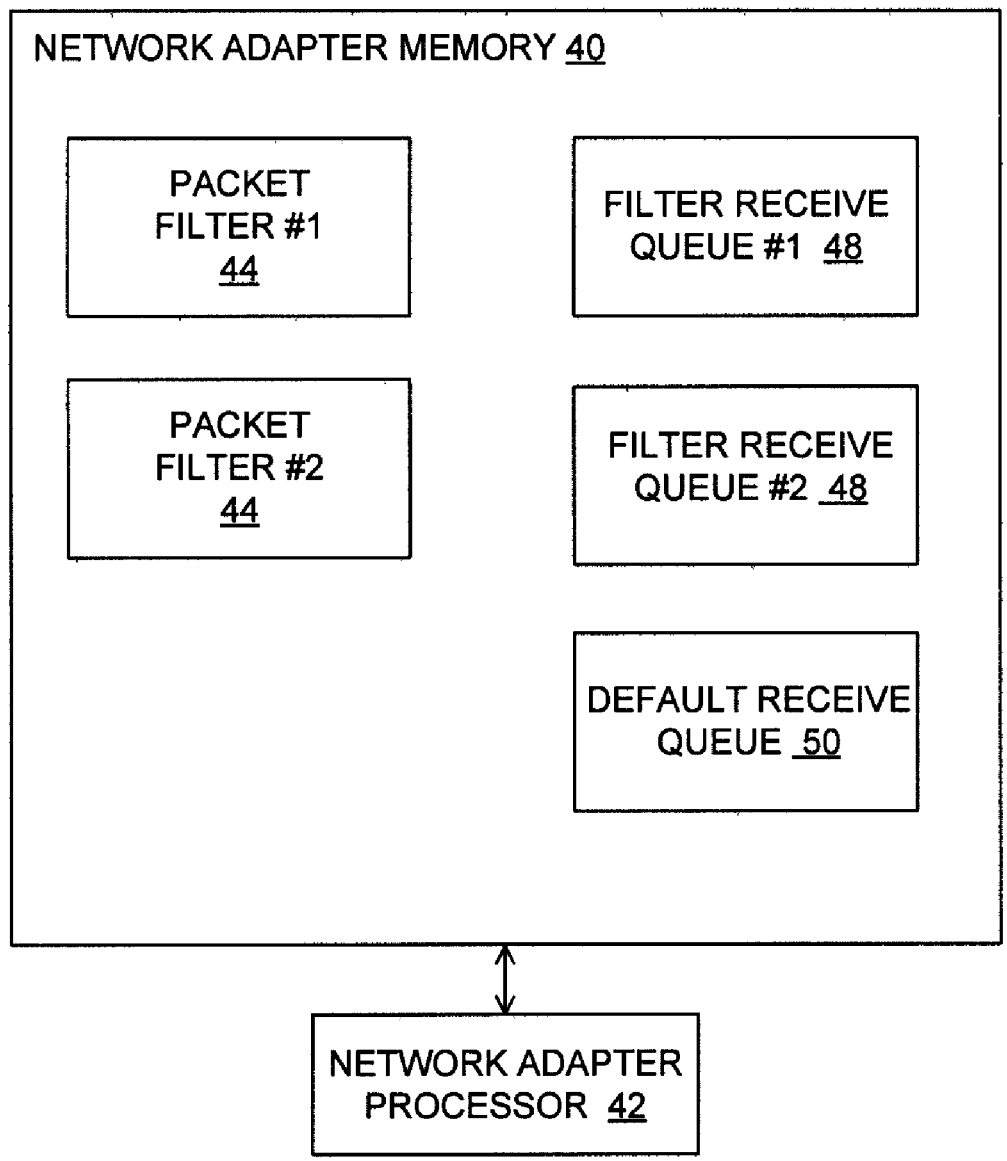
FIG. 2 is a diagram of an adapter memory subsystem of a network adapter in the virtual environment of FIG. 1, according to some embodiments of the present invention.

With respect to FIG. 2, the network adapter 22 of FIG. 1 may be illustrated as having an adapter memory subsystem 40 and an adapter processor 42 coupled to the adapter memory subsystem 40. The memory subsystem 40 may be made up of one or more suitable physical memories to support the various logical components in memory. Likewise, when the term "memory" is referred to in the claims, it may include one or more physical memories. In the addressable memory space of the adapter memory subsystem 40, there may be stored a number of packet filters 44. In some embodiments, there may be one packet filter 44 associated with each of the virtual systems 14 of FIG. 1. Since two virtual systems 14 are illustrated in FIG. 1, two packet filters 44 are shown in FIG. 2, with one being labeled as packet filter #1 to correspond to the first virtual system 14 of FIG. 1 and packet filter #2 to correspond to the second virtual system 14 of FIG. 1. Based upon requests from the IO container 18, the packet filters 44 may be added and removed dynamically from the adapter memory subsystem 40. The packet filters 44 may be configured through the VBS 20 or other IO container specific mechanism. The physical device driver 26 may add the packet filter 44 to the memory subsystem 40 and therefore to the hardware of the network adapter 22. In some embodiments, the packet filters 44 may use the MAC address of the packets to find a match and sort the plackets. Hence, the network adapter 22 may be characterized as filtering a receive packet through the packet filters 44 to determine if one of the packet filters 44 is a matching packet filter.

The memory subsystem 40 may also include a filter receive queue 48 assigned to each of the virtual system packet filters 44 and a default receive queue 50 for packets not matching one of the packet filters 44. Hence, in some embodiments, for a given virtual system 14 of FIG. 1, there may be an associated packet filter 44 and filter receive queue 48 in the network adapter 22.

To offload the VBS packet sorting operation of the IO container 18 of FIG. 1, the network adapter 22 may provide the capability to filter received packets using the packet filters 44, with filtering being based on a network Layer 2 criteria (e.g., MAC address and virtual local area network [VLAN] ID). The sorted network traffic (packet) may be sent to the appropriate assigned filter receive queue 48, but if there is no match to one of the packet filters 44, then the packet may be sent to a default receive queue 50.

Figure 3:
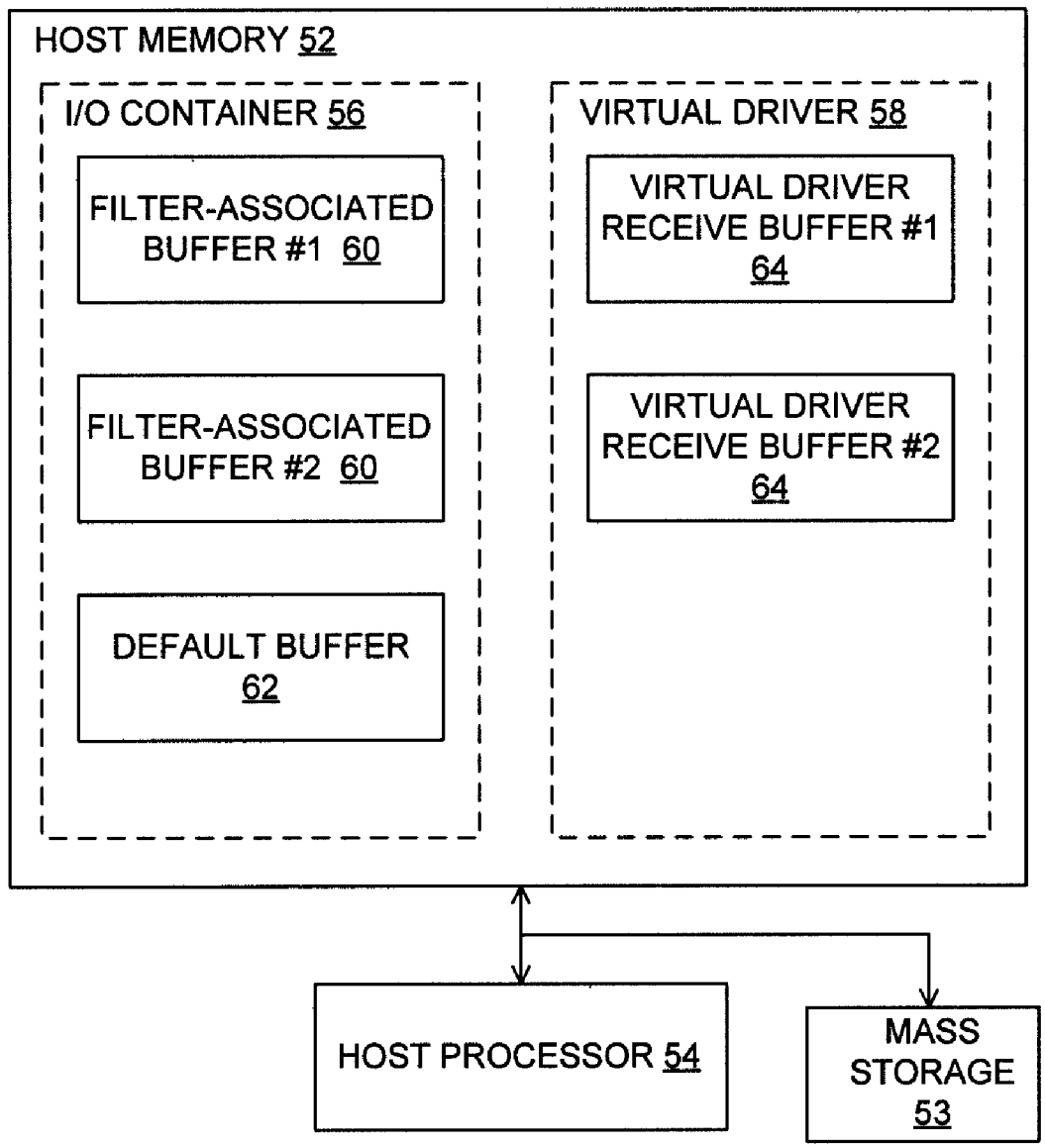
FIG. 3 is a diagram of one configuration of a host memory subsystem of a host computer in the virtual environment of FIG. 1, according to some embodiments of the present invention.

With respect to FIG. 3, the host computer 12 of FIG. 1 may be illustrated as having a host memory subsystem 52, a mass storage 53, and a host processor 54 (or multiple processors) coupled to the host memory subsystem 52 and the mass storage 53. The host memory subsystem 52 may be made up of one or more memories. The host memory subsystem 52 may have addressable sections, with an IO container memory subsystem section 56 allocated to the IO container 18 of FIG. 1 and a virtual driver memory section 58 allocated to the virtual drivers 30. The IO container memory section 56 may contain a number of filter-associated buffers 60, with each of the buffers 60 being associated with and carrying traffic for one of the virtual systems 14 of FIG. 1. The IO container memory section 56 also may contain a default buffer 62. In general, the IO container memory section 56 may be allocated to and under the control of the physical device driver 26, which may be a software driver executed by the host processor 54. Likewise, the virtual driver memory section 58 may contain a number of virtual driver receive buffers 64, with there one of the virtual driver receive buffers 64 for each of the virtual systems 14 of FIG. 1.

As previously described, the architecture of the virtual environment 10 needs to have the ability to filter packets in a promiscuous mode. Promiscuous mode is used by the VBS 20 to allow transparent bridging. Any incoming packets "received" by the network adapter 22 (receive packets) in the promiscuous mode may be checked against configured Layer 2 packet filters 44. If a packet matches a specific packet filter 44 (a "packet matching filter"), then the filter-matched receive packet may be placed into the filter receive queue 48 assigned to that particular packet filter 44. If a packet does not match any filter, then it may be placed into the default receive queue 50 to comply with the VBS "transparency" need.

In summary, when a given receive packet matches one of the packet filters 44, that packet filter 44 may be referred to as a "packet matching filter" and the receive packet may be referred to as a "filter-matched receive packet". When a receive packet that matches one of the packet filters 44, this means that there is a filter-matched receive packet which has one of the virtual systems 14 as its desired destination, with this virtual system 14 being associated with and identified by that packet filter 44. Consequently, for each of the packet filters 44, there is at least one corresponding filter receive queue 48, filter-associated buffer 60 and virtual driver receive buffer 64. In other words, to reach the virtual system 14, the filter-matched receive packet travels through a filter receive queue 48, a filter-associated buffer 60 and a virtual driver receive buffer 64, all of which may be characterize as being "associated with" and "corresponding with" each other, the matching filter 44 and the virtual system 14 which is the destination of the filter-matched receive packet. Additionally, each filter receive queue 48 may be characterized as being "assigned to" one of the packet filters 44 in that filter-matched receive packets matching the particular packet filter 44 are placed in the filter receive queue 48 "assigned to" that packet filter 44.

Figure 4A:
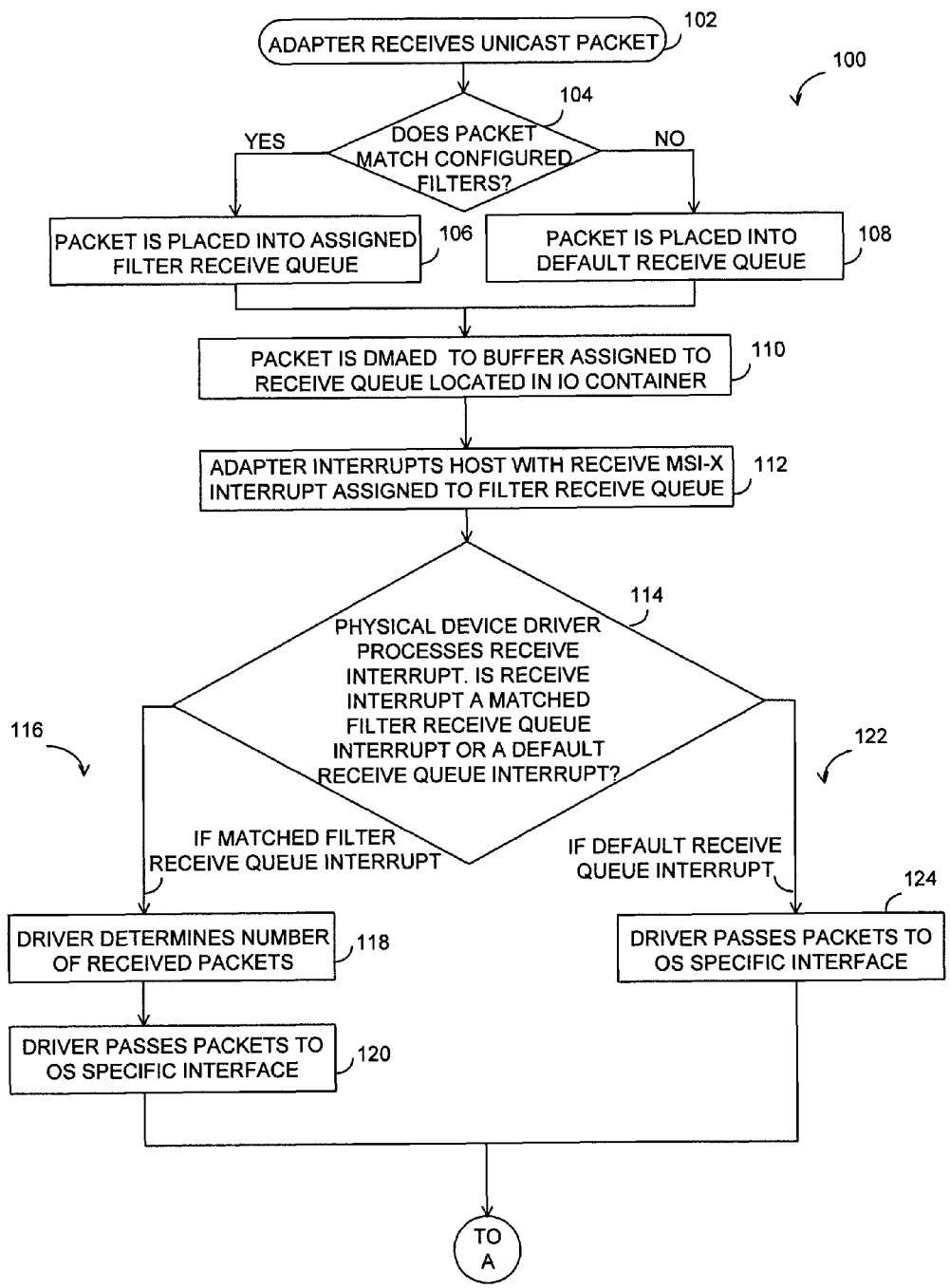
FIG. 4 (divided over FIGS. 4A and 4B) is a flow chart for the virtual environment of FIG. 1, according to some embodiments of the present invention.
Figure 4B:
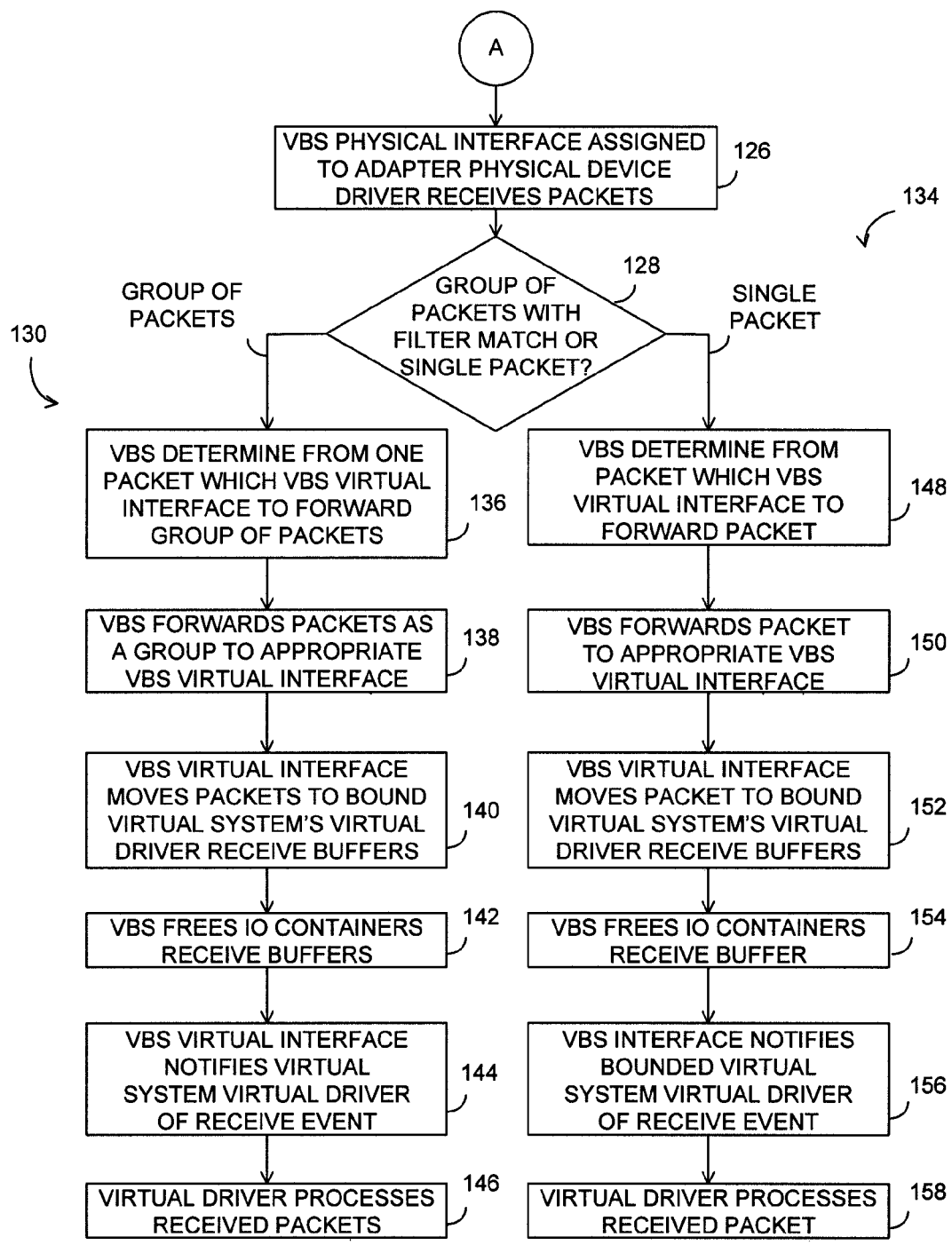

In a flow chart of FIG. 4 (divided over FIGS. 4A and 4B), there is shown an illustrative example of the offloading capabilities for the VBS 20 in the virtualized environment of FIG. 1, according to some embodiments of the present invention. Offloading for the VBS 20 is achieved by using of the packet filtering capabilities in the network adapter 22 that pre-sort the receive data flow from the external network 32 prior to processing by the VBS 20. The flow chart of FIG. 4 will be explained in conjunction with reference to physical and logical components in FIGS. 1-3.

Referring to FIGS. 1-4, in a VBS pre-sorted procedure 100 of FIG. 4, in an operation 102, the network adapter 22 receives a unicast packet. In an operation 104, the network adapter 22 attempts to match packet against configured packet filters 44. If a filter matches, then the procedure 100 proceeds to an operation 106, where the matched packet may be placed into the assigned filter receive queue 48. If there are no filter matches in the operation 104, the procedure 100 may proceed to an operation 108, where the packet may be placed into the default receive queue 50.

In an operation 110, the packet may be DMAed by the adapter processor 42 from the filter receive queue 48 or the default receive queue 50 in the network adapter memory subsystem 40 to the filter-associated buffer 60 assigned to filter receive queue 48 or the default buffer 62, respectively. The filter-associated buffer 60 may be located in the IO container 18 and more specifically, may be located in the IO container memory section 56, which is allocated to the physical device driver 26. Depending on VMM interrupt architecture, in an operation 112 the network adapter 22 may interrupt the host processor 54 with a receive Message-Signaled Interrupt (MSI)-X interrupt assigned to a filter receive queue 48 containing filter-matched receive packets (a matched-filter receive queue interrupt) or assigned to the default receive queue 50 (a default receive queue interrupt).

In an operation 114, the physical device driver 26 for the network adapter 22 may process the receive interrupt. If the receive interrupt is determined to be a matched-filter receive queue interrupt (indicating a filter match in the operation 106), then the procedure 100 proceeds to a branch 116 and may perform the following operations. In an operation 118, the physical device driver 26 may determine the number of received packets. In an operation 120, the physical device driver 26 may pass the packets to the OS specific interface 29 from the filter-associated buffer 60. In one embodiment, a group of packets may be passed to the OS specific interface 29. The OS specific interface 29 also may receive a match indicator, which indicates that all packets in the group match a specific packet filter 44. If the receive interrupt is determined to be a default receive queue interrupt in the operation 114 (indicating no filter match in operation 108), then the procedure 100 may proceed to a branch 122 and may undertake the following operation. In an operation 124 the physical device driver 26 may pass the packets to the OS specific interface 29 in a group or one at a time with a non-match indicator indicating that the packet(s) do not match any of the packet filters 44.

From operation 120 or 124, the procedure 100 proceeds to an operation 126. In the operation 126, the physical interface 29 assigned to physical device driver 26 may receive the packets. In an operation 128, if a group of packets with a filter match indicator is received, the procedure 100 proceeds with a branch 130. If a single packet is indicated, then the procedure 100 proceeds with a branch 134.

Upon a group of packets being received at operation 128, the procedure 100 proceeds to operation 136, where the VBS 20 may determine from one packet of the group of packets which of the virtual interfaces 24 of the VBS 20 to forward the group of packets. In an operation 138, the VBS 20 may forward packets as a group to appropriate virtual interface 24. In an operation 140, the virtual interface 24 may move packets to bound the receive buffer 64 of one of the virtual drivers 30, which is part of one of the virtual systems 14. In an operation 142, the VBS 20 may free the filter-associated buffers 60 of the IO container 18. In an operation 144, the virtual interface 24 of the VBS 20 may notify the bounded virtual driver 30 of the virtual system 14 of a "receive event". In an operation 146, the virtual driver may process the received packets.

If a signal packet is indicated in the operation 128, then the procedure 100 proceeds to an operation 148, where the VBS 20 may determine from the packet which virtual interface 24 of the VBS to forward the packet. In an operation 150, the VBS 20 may forward the packet to the appropriate virtual interface 24 of the VBS 20. In an operation 152, the virtual interface 24 may move the packet to bound the receive buffer 64 of the virtual driver 30. In an operation 154, the VBS 20 may free the filter-associated buffer 60 of the IO container 18. In an operation 156, the virtual interface 24 may notify the bounded virtual driver 30 of a "receive event". In an operation 158, the virtual driver 30 may process the received packet.

With reference to FIGS. 1-2 and 5-7, the virtual environment 10, according to some embodiments of the present invention, may employ a direct DMA mode of operation of the network adapter 22. The network adapter 22, by virtue of its ability to place filtered packets (filtered-matched packets) into specific filter-associated buffers, may further reduce the operational overheads of the IO container 18 using this direct DMA mode. In these embodiments, filter-associated shared buffers are used, which are shared between the IO container 18 and the virtual drivers 30.

The memory arrangement the adapter memory subsystem 40 of the network adapter 22, as shown in FIG. 2, remains the same. However, the memory arrangement of the host memory subsystem is different; hence, the new arrangement is shown in FIG. 5. Referring to FIG. 5, a host memory subsystem 200 includes a number of filter-associated shared buffers ("shared buffers") 202 in an IO container address space 204. The host memory subsystem 200 may be made up of one or more suitable memories. In some embodiments, there may be one filter-associated shared buffer 202 for each of the virtual systems 14. Additionally, there may be one default buffer 206. There may be a filter specific allocation pool (buffer pool) 208 with unassigned filter specific receive buffers 210 provided by the virtual drivers 30, with each filter specific receive buffer 210 being associated with one of the virtual systems 14 and one of the packet filters 44. The host processor 54 and the mass storage 53 are the same as shown in FIG. 3.

In the direct DMA mode, the filter-associated shared buffers 202 are shared between the virtual drivers 24 of the virtual systems 14 and the IO container 18 to which the network adapter 22 is assigned. As will be described in more detail hereinafter, the virtual driver 30 may pass a receive buffer 210 to the filter specific allocation pool (buffer pool) 208, which is part of the host memory subsystem 200 allocated to the IO container 18. In other words, the receive buffer 210 of the virtual driver 30 would not be given directly to the physical device driver 26. Instead it is "pooled" in the buffer pool 208 of IO container 18 and allocated to the physical device driver 26 when the physical device driver 26 requests a filter specific shared buffer, which could be at a much later time. Upon being allocated, the receive buffer 210 may become a filter-associated shared buffer 202 in the IO container address space 204. Another way of describing this is that the virtual drivers 30 are provisioning the IO container 18 with filter specific receive buffers 210 to be used in future buffer allocations by the physical device driver 26.

The physical device driver 26 of the network adapter 22 may allocate or assign the filter-associated shared buffers 202 to the filter receive queues 48 on the basis of packet filters 44. For example, if a MAC address filter 44 is set to 00-02-B3-90-DF-0E, which corresponds to the MAC address of one of the virtual systems 14, only the shared buffer 202 for this virtual system 14 can be used with the packet filter 44 having the MAC address 00-02-B3-90-DF-0E and its associated filter receive queue 48. If a particular virtual system 14 does not share it's receive buffer with the IO container 18, then the non-shared, filter-associated buffers (buffers 60 in FIG. 3) of the IO container 18 may be used. Packets matching the non-sharing packet filter 44 would not be directly DMAed, but packet processing instead may be undertaken in accordance with the VBS pre-sorted procedure 100 of FIG. 4. In other words, direct DMA may be used on some filter receive queues 48 and not on others.

Figure 6A:
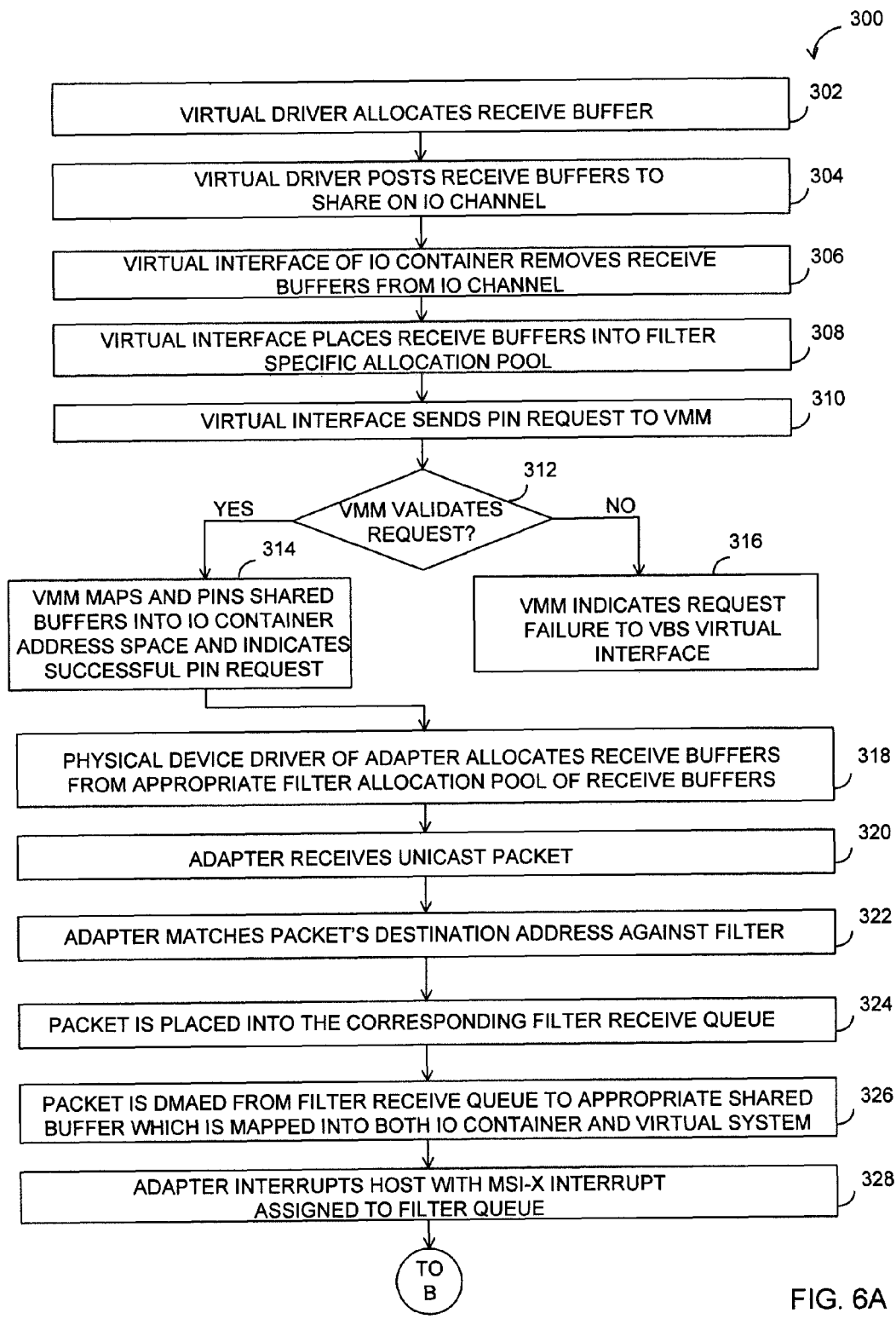
FIG. 6 (divided over FIGS. 6A, 6B, and 6C) is a flow chart for the virtual environment of FIG. 1, according to some embodiments of the present invention.
Figure 6B:
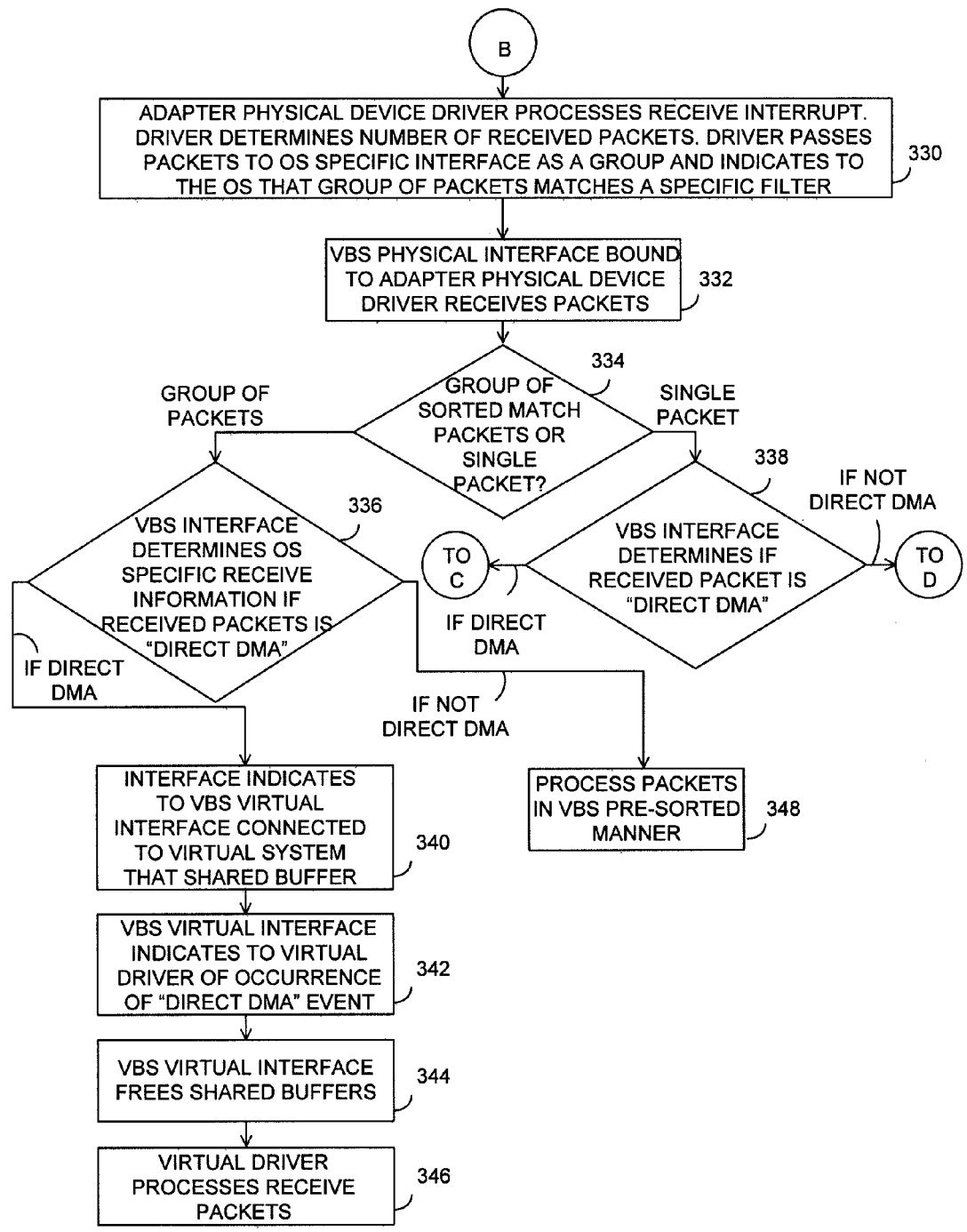
Figure 6C:
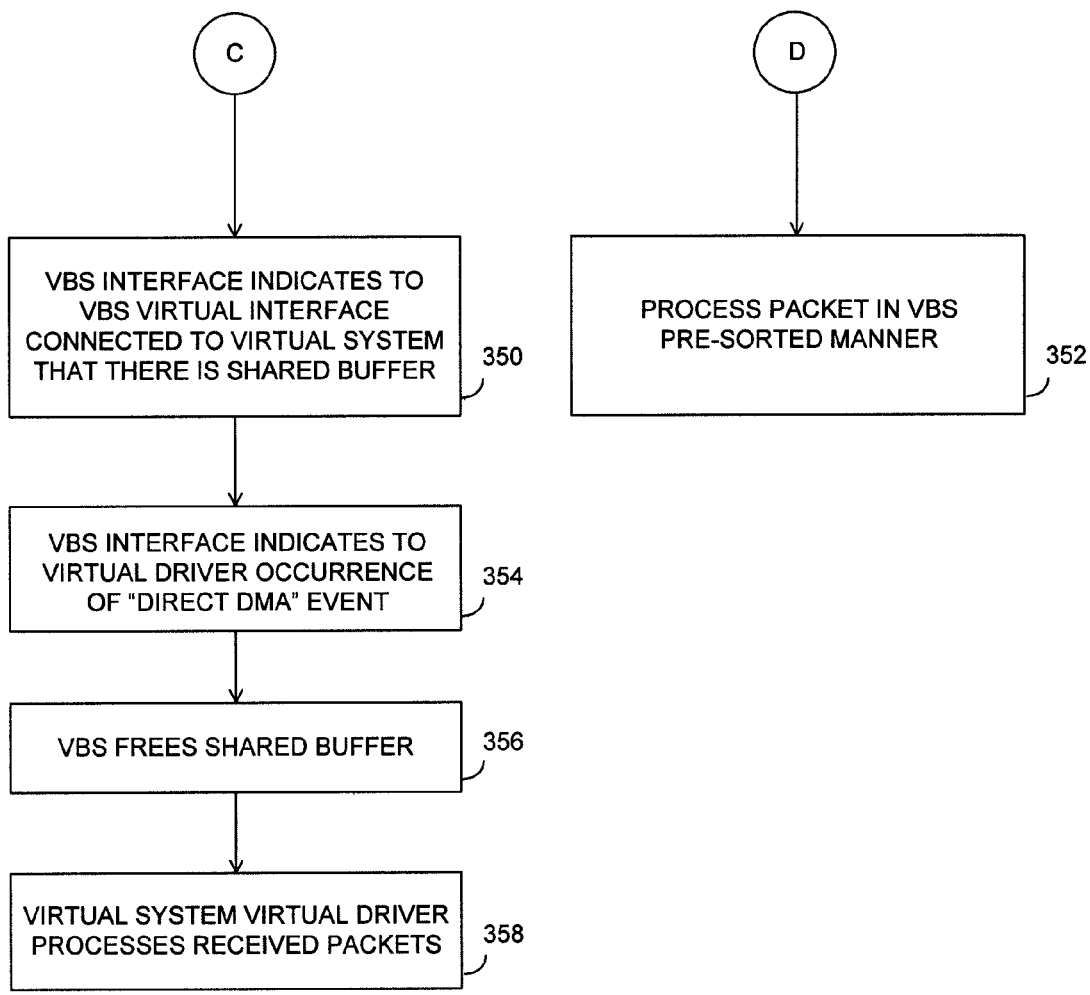

In a flow chart of FIG. 6 (divided over FIGS. 6A, 6B and 6C), there is shown an illustrative example of the use of the direct DMA capabilities of the network adapter 22 in the virtual environment 10 of FIG. 1, in accordance with some embodiments of the present invention. The flow chart of FIG. 6 will be explained in conjunction with reference to physical and logical components in FIGS. 1, 2, and 5.

Referring to FIGS. 1-2 and 5-6, a packet direct DMA procedure 300 is shown for a packet received from the external network 32, with the procedure 300 using the direct DMA capabilities of the network adapter 22. In an operation 302, the virtual driver 30 may allocate a filter specific receive buffer 210. In an operation 304, the virtual driver 30 may post the receive buffer 210 to share on its IO channel 31. In an operation 306, the virtual interface 24 of the IO container 18 may remove the receive buffer 210 from IO channel 31. In an operation 308, the virtual interface 24 may place the receive buffer 210 into the filter specific allocation pool 208.

Figure 10:
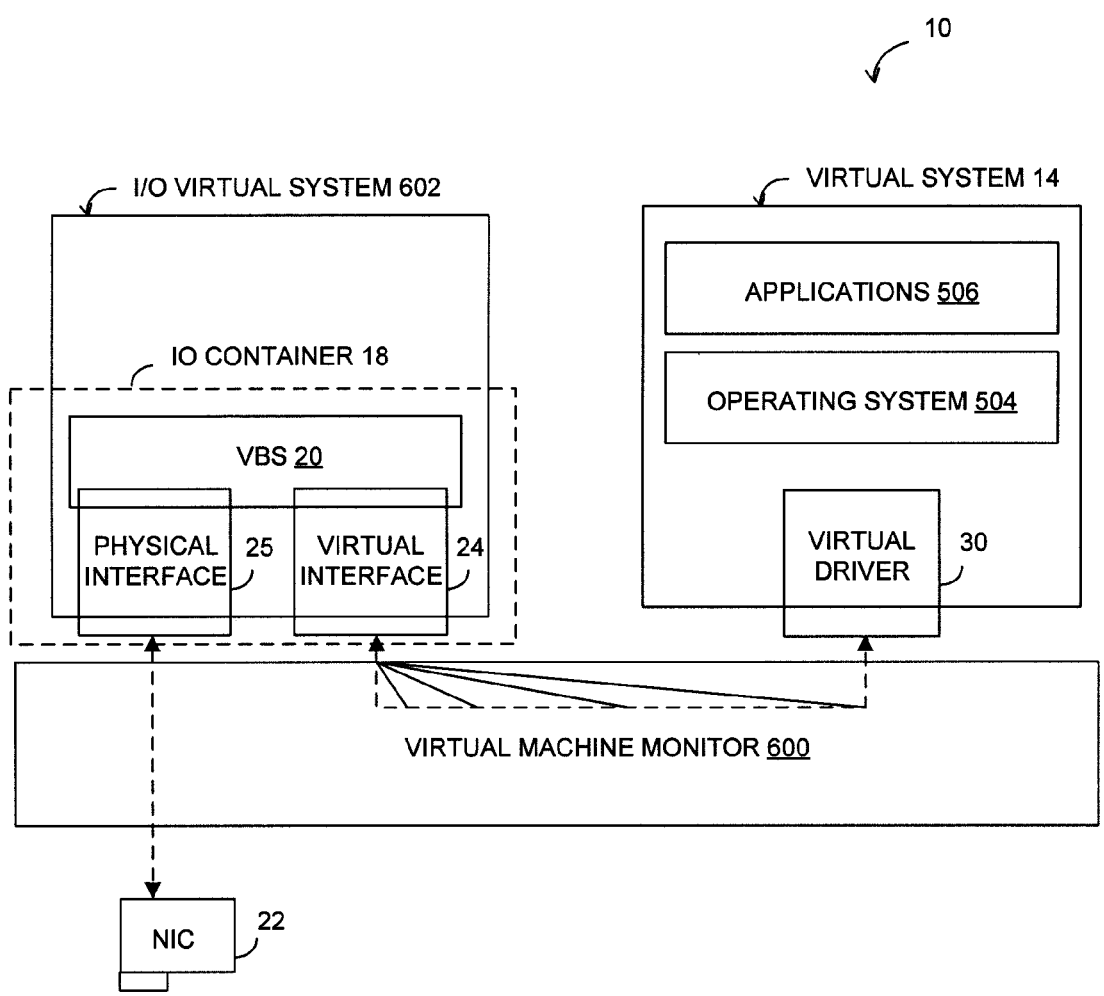
FIG. 10 is the virtual environment of FIG. 1 with another configuration of the VMM, according to some embodiments of the present invention.

In an operation 310, the virtual interface 24 may send a pin request to VMM (see FIGS. 9 and 10). In an operation 312, the VMM validates the pin request. If request is determined to be valid in the operation 312, then the procedure 300 may proceed to an operation 314, where the VMM may map and pin the receive buffers 210 (becomes filter-associated shared buffer 202) into the address space 204 for the IO container 18 and may indicate a successful pin request. If the request is determined to be invalid in the operation 312, then the procedure 300 may proceed to an operation 316, where VMM may indicate a request failure to VBS virtual interface 24. After operation 314, the procedure 300 may proceed to an operation 318, where the physical device driver 26 of the network adapter 22 may allocate the filter specific buffer 210 from the filter allocation pool 208 so that it becomes a filter-associated shared buffer 202.

In an operation 320, the network adapter 22 receives an unicast packet. In an operation 322, the network adapter 22 may match the packet's destination address against the packet filter 44. In an operation 324, the packet may be placed into the corresponding filter receive queue 48. In an operator 326, the packet may be DMAed from the filter receive queue 48 to the appropriate shared buffer 202, which is mapped into both the IO container 18 and the virtual system 14.

In an operation 328, the network adapter 22 may interrupt the host processor 54 with MSI-X interrupt assigned to filter receive queue 48. In an operation 330, the physical device driver 26 may processes the receive interrupt. For example, the physical device driver 26 may determine number of received packets. The driver 26 passes the packets to the OS specific interface 29 as a group and may indicate to the OS (not shown) that the group of packets matches a specific packet filter 44. In an operation 332, the VBS physical interface 25, which is bound to adapter physical driver 26, receives the packets. In an operation 334, there is a determination as to whether the received packets are a group of sorted packets or a signal packet. If the there is a group of sorted match packets, the procedure 300 proceeds to an operation 336. If there is a single packet, then the procedure 300 proceeds to an operation 338.

At both of the operations 336 and 338, a further determination is made as to whether the direct mode of operation has or has not been invoked. More specifically, in the operation 336, the VBS physical interface 25 may determine from the packet OS specific receive information where the receive packets is a "direct DMA" transfer. If it is a direct DMA transfer, in an operation 340, the VBS physical interface 25 may indicate to VBS virtual interface 24, which is connected to virtual system 14, that there is a filter-associated shared buffer 202. In an operation 342, the VBS virtual interface 24 may indicate to the virtual driver 30 of the virtual system 14 that there is a direct DMA event. In an operation 344, the VBS virtual interface 24 may free the filter-associated shared buffers 202. In an operation 346, the virtual driver 24 may process the received packets. If in the operation 336, the packets are determined not to be a direct DMA transfer, then in an operation 348, the packets may be processed using the VBS pre-sorted procedure 100 of FIG. 4.

In the operation 338 for a single packet, the VBS physical interface 25 may determine that the packet is received in a "direct DMA" transfer. If it is a direct DMA transfer, then the procedure 300 proceeds to an operation 350 and if it is not a direct DMA operation, then the procedure proceeds to an operation 352. If a direct DMA transfer, then in the operation 350 the VBS physical interface 25 may indicate to the VBS virtual interface 24, which is connected to virtual system 14, that there is a shared receive buffer. In an operation 354, the VBS physical interface 25 may indicate to the virtual driver 30 of the virtual system 14 that there is a direct DMA event. In an operation 356, the VBS 18 may free the filter-associated shared buffer 202. In an operation 358, the virtual driver 30 of the virtual system 14 may process the received packets. If it is not a DMA operation, then in the operation 352 the packet may be processed using the VBS pre-sorted procedure 100 of FIG. 4.

In the virtual environment 10 of FIG. 1, according to some embodiments of the present invention, the VBS 20 may allow access by a virtual system 14 to the external networks 32 by way of the supporting virtual interfaces 24, which may be connected to the network adapter 22. To counteract the previously described "head of the line blocking" issue, the network adapter 22 may utilize a "transmit fairness" structure and procedure. This transmit fairness structure and procedure will be described with respect to FIGS. 1, 7 and 8.

Figure 7:
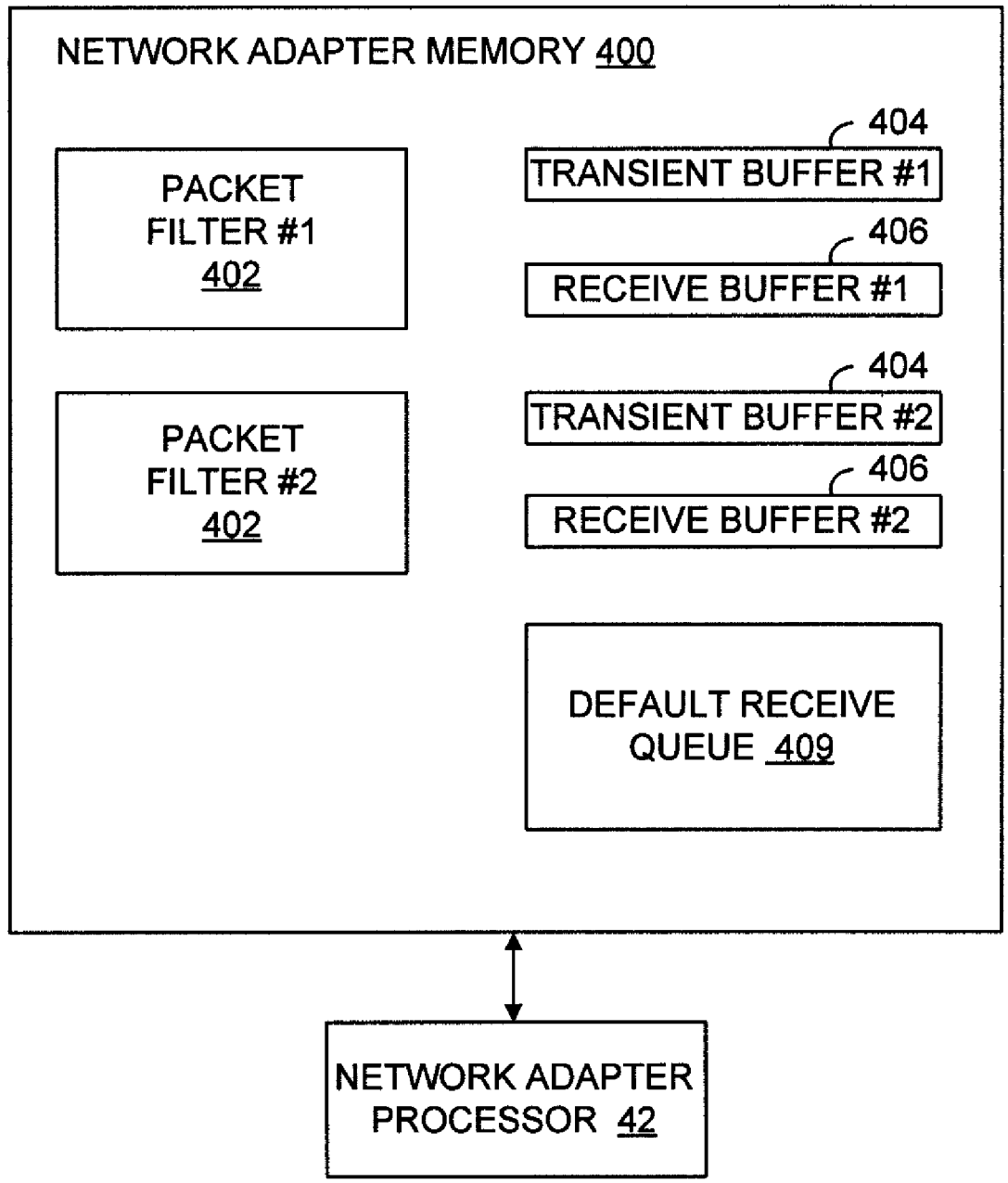
FIG. 7 is a diagram of another configuration of the host memory subsystem of a host computer in the virtual environment of FIG. 1, according to some embodiments of the present invention.

Referring to FIG. 7, the network adapter 22 may include in a network adapter memory subsystem 400. The memory subsystem 400 may include a number of packet filters 402, with each of the packet filters 402 being associated with each of the virtual systems 14. The memory subsystem 400, for each packet filter 402, may be a pair of individual queues (queue pair), which includes a transmit queue 404 and a filter receive queue 406. More specifically, there may be queue pairs for each packet filter 402 up to a maximum number of pairs of queues support by a specific implementation of the network adapter 22. An adapter processor 407 may be coupled to the memory subsystem 400. The memory subsystem 400 may also include a default receive queue 409. A transmit packet, that is passed to the physical device driver 26, may be placed in the transmit queue 404 of a queue pair that matches the appropriate packet filter 402. Transmit queues 404 may be serviced in a round robin manner by the network adapter 22. This approach may limit the amount of 'head of line' blocking and provides transmit fairness.

Figure 8:
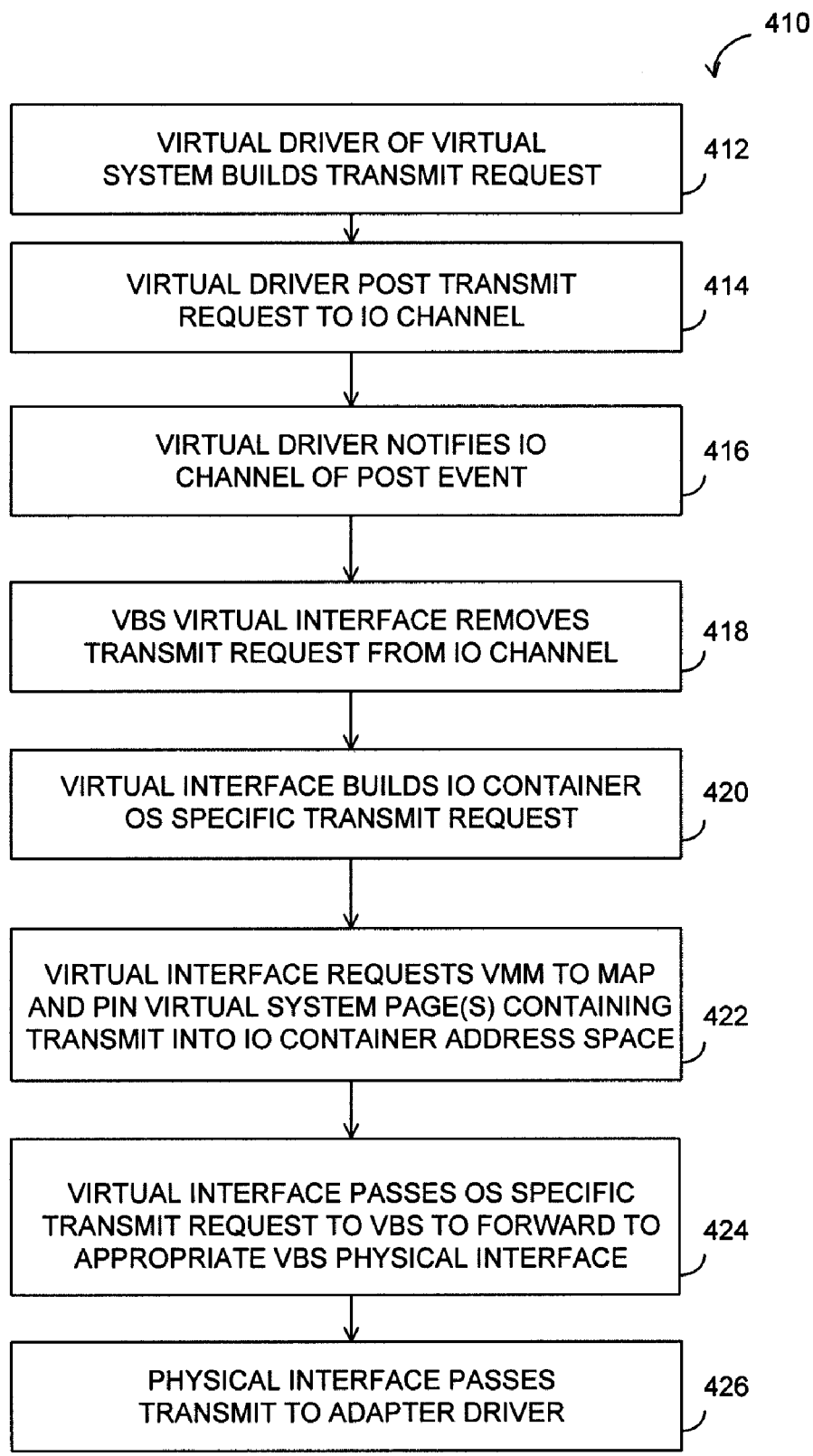
FIG. 8 is a flow chart for selected aspects of the virtual environment of FIG. 1, according to some embodiments of the present invention.

In a flow chart of FIG. 8, there is shown an illustrative example of transmitting a packet utilizing the transmit fairness capabilities of the network adapter 22 in the virtualized environment of FIG. 1, according to some embodiments of the present invention. The flow chart of FIG. 8 will be explained in conjunction with reference to physical and logical components in FIGS. 1 and 7.

In an operation 410, the virtual driver 30 of virtual system 14 may build a transmit request. In an operation 412, the virtual driver 30 may post transmit request to the IO channel 31. In an operation 414, the virtual driver 30 may notify the IO channel 31 of a post event. In an operation 416, the VBS virtual interface 24 may remove the transmit request from the IO channel 31. In an operation 418, the virtual interface 24 may build an IO container OS specific transmit request. In an operation 420, the virtual interface 24 may request the VMM to map and pin virtual system pages containing the transmit packet into IO container address space. In an operation 422, the virtual interface 24 may pass an OS specific transmit packet request to VBS 20 to forward to appropriate VBS physical interface 25. In an operation 424, the physical interface 25 may pass the transmit packet to the physical device driver (adapter driver) 26. In an operation 426, the physical device driver 26 may place the transmit packet in the appropriate transmit queue 404.

Referring to FIGS. 9 and 10, two implementations to the virtual environment 10 of FIG. 1 are shown with different VMM architectures. These implementations illustrate that the network adapter 22, with its offloading capabilities, may accelerate the VBS 20, regardless of VMM architecture and the location of the IO container 18. In both implementations shown in FIGS. 9 and 10, the IO Container 18 is a software construct that may allow virtualized physical devices, such as the network adapter 22, to be shared among multiple virtual systems 14.

Referring to FIG. 9, the virtual environment 10 of FIG. 1, according to some embodiments of the present invention, is shown including a VMM 500, with the VBS 20 being located in the VMM 500. Each of the virtual systems 14 may be illustrated as including a system VM 502 running a guest operating system 504, and one or more guest software applications programs 506. As previously described with respect to FIG. 1, the VBS 20 may be coupled to the virtual systems 14 and the network adapter 22. In this embodiment, the IO container 18 components, which include the VBS 20, may be integrated into the VMM 500 or hypervisor and are not part of a specialized virtual system. This architecture for generating multiple VMs 502 is commonly used by VMware, Inc. of Palo Alto, Calif.

Referring to FIG. 10, the virtual environment 10, according to other embodiments of the present invention, is shown including a VMM 600, with the VBS 20 residing outside of the VMM 600 and instead residing in a specialized I/O virtual system (subsystem) 602 that provides I/O services. The IO container 18 may be part of a deprecated OS running in the specialized I/O virtual system 602. As previously described, the virtual environment 10 may include multiple virtual systems 14 (only one is illustrated in FIG. 10), which also may be referred to as "application virtual systems". As previously shown in FIG. 9, the virtual systems 14 may each include the guest operating system 504, guest software application programs 506, and the VM (just the virtual driver 30 shown in FIG. 10). The IO container 18 in the specialized I/O virtual system 602 may have the physical interface 25 in communications with the network adapter 22 and the virtual interface 24 in communications with the virtual driver 30 of the virtual system 14. Although only one virtual system 14 is illustrated, the virtual environment 10 may have multiple virtual systems 14, as shown in FIG. 1. For example, this architecture is used by the Microsoft Viridian, provided by Microsoft Corp.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method, comprising:
   determining, by a network adapter of a host computer, whether respective ones of a plurality of receive packets match a packet filter associated with one of a plurality of virtual operating systems operating on the host machine, the plurality of virtual operating systems sharing the network adapter via an input output container (IO container) that is separate and distinct from the network adapter,
   wherein the packet filter is based on a media access control (MAC) address of the one of the plurality of virtual operating systems;
   placing, by the network adapter, one or more matching ones of the plurality of receive packets into a filter receive queue of the network adapter assigned to the packet filter in response to a determination that the one or more matching ones of the plurality of receive packets match the packet filter; and
   transferring, by the network adapter, the one or more matching receive packets from the filter receive queue to a buffer of the IO container associated with the packet filter,
   wherein the buffer is managed by a physical device driver of the IO container, and
   wherein the physical device driver is configured to:
      count the one or more matching receive packets from the filter receive queue;
      transfer the one or more matching receive packets as a group of receive packets to a physical interface of a virtual switch/bridge (VBS) with an indication indicating that the group of receive packets are from the filter receive queue assigned to the matching packet filter; and
      prior to said count, examine a received interrupt signal from the network adapter to determine that the one or more matching receive packets are from the filter receive queue assigned to the matching packet filter.

2. The method according to claim 1, further comprising:
   placing, by the network adapter, one or more of the plurality of receive packets into a default receive queue based upon a determination that the one or more of the plurality of receive packets do not match the packet filter; and
   transferring, by the network adapter, the one or more of unmatched receive packets from the default receive queue to a default buffer in the host computer.

3. The method according to claim 1, wherein the VBS is configured to:
   determine whether the one or more matching receive packets include a plurality of receive packets or a single receive packet; and
   in response to the VBS having received the plurality of receive packets, determine, based on one of the plurality of receive packets, to which one of a plurality of virtual interfaces of the VBS to send the plurality of receive packets, wherein the virtual interfaces are respectively associated with the plurality of virtual operating systems.

4. The method according to claim 3, wherein the IO container is configured to:
   after a determination of which of the one of the plurality of virtual interfaces to send the plurality of receive packets, send the plurality of matching receive packets together as a group to the determined one of the plurality of virtual interfaces; and
   transfer the plurality of receive packets from the determined one of the plurality of virtual interfaces to a virtual driver of a corresponding one of the plurality of virtual operating systems.

5. The method according to claim 1, wherein the buffer of the IO container is shared with a virtual driver of the one of the plurality of virtual operating systems.

6. The method according to claim 5, wherein the buffer is a filter specific receive buffer, and the virtual driver is configured to:
   allocate the filter specific receive buffer;
   move the filter specific receive buffer to a virtual interface of a virtual switch/bridge (VBS) of the IO container; and
   place the filter specific receive buffer in a buffer allocation pool; and
   wherein said to allocate the filter specific receive buffer further includes to allocate the filter specific receive buffer from the buffer allocation pool by mapping the filter specific receive buffer to a memory space allocated to the IO container so that the filter specific receive buffer becomes the shared buffer.

7. The method according to claim 1, further comprising:
   providing, by the network adapter, a transmit queue associated with the packet filter.

8. A network adapter, comprising:
   a memory configured to host a plurality of packet filters associated with a plurality of virtual operating systems sharing the network adapter via an input output (IO) container that is separate and distinct from the network adapter,
   wherein the network adapter and the IO container are configured to reside in a host computer configured to operate the plurality of virtual operating systems,
   wherein respective ones of the plurality of packet filters are associated with corresponding ones of the plurality of virtual operating systems and are based on respective media access control (MAC) addresses of the plurality of virtual operating systems,
   wherein the memory is further configured to host a plurality of filter receive queues correspondingly assigned and respectively operatively coupled to the plurality of packet filters; and
   one or more processors coupled to the memory and configured to cause the network adapter to:
      determine whether respective ones of a plurality of packets received by the network adapter match one of the plurality of packet filters;

upon a determination that one or more matching ones of the plurality of packets match the one of the plurality of packet filters, place the one or more matching packets in one of the plurality of filter receive queues assigned to the matching one of the plurality of packet filters; and transfer the one or more matching packets from the one of the plurality of filter receive queues to a buffer of the IO container associated with one of the plurality of virtual operating systems corresponds to the matching one of the plurality of packet filters;

wherein the buffer is managed by a physical device driver of the IO container, and wherein the physical device driver is configured to:
  count the one or more matching packets from the filter receive queue;
  transfer the one or more matching packets as a group of receive packets to a physical interface of a virtual switch/bridge (VBS) with an indication indicating that the group of receive packets are from the filter receive queue assigned to the matching packet filter; and
  prior to the count, examine a received interrupt signal from the network adapter to determine that the one or more matching packets are from the filter receive queue assigned to the matching packet filter.

9. The network adapter according to claim 8,
wherein the memory is further configured to host a default receive queue; and
wherein the one or more processors are further configured to cause the network adapter to place one or more of the plurality of received packets in the default receive queue, upon a determination that the one or more received packets do not match any of the plurality of packet filters.

10. The network adapter according to claim 9, wherein the one or more processors are further configured to cause the network adapter to transfer the receive packet from the default receive queue to another buffer residing in the IO container.

11. A system, comprising:
one or more host processors configured to operate a plurality of virtual operating system;
a host memory coupled to the one or host processors configured to host an input output (IO) container operatively coupled to the plurality of virtual operating systems, the IO container including a plurality of buffers respectively associated with the plurality of virtual operating systems; and
a network adapter coupled to the IO container, wherein the network adapter includes an adapter processor and an adapter memory coupled to the adapter processor;
wherein the IO container is configured to allow shared access of the network adapter by the plurality of virtual operating systems;
wherein the adapter memory is configured to host a plurality of packet filters respectively associated with the plurality of buffers, and a plurality of filter receive queues respectively assigned to the plurality of packet filters;
wherein respective ones of the plurality of packet filters are associated with corresponding ones of the plurality of virtual operating systems, and are based on media access control (MAC) addresses of the plurality of virtual operating systems;
wherein the network adapter is configured to receive a plurality of packets, and the adapter processor is configured to:
match one or more of the plurality of receive packets to one of the plurality of packet filters,
move the one or more filter-matched receive packets to one of the plurality of filter receive queues assigned to the matching one of the plurality of packet filters,
move the one or more filter-matched receive packets in the matching one of the plurality of filter receive queues to one of the plurality of buffers corresponding to the matching packet filter,
wherein the IO container includes a physical device driver having an operation system (OS) specific physical interface, and a virtual switch/bridge (VBS) coupled to the OS specific interface and including a plurality of virtual interfaces respectively correspond to the plurality of virtual operating systems;
wherein the physical device driver is configured to move the one or more filter-matched receive packets from the filter-associated buffer corresponding to the matching packet filter to the OS specific interface; and
wherein the VBS is configured to move the one or more filter-matched receive packets from the OS specific interface to one of the virtual interfaces.

12. The system according to claim 11, wherein:
the adapter memory is further configured to host a default receive queue; and
wherein the adapter processor is further configured to place the unmatched receive packet in the default receive queue, upon determining that one of the plurality of receive packets does not match any of the plurality of packet filters.

13. The system according to claim 12, wherein the host memory further includes a default buffer; and the adapter processor is further configured to move the unmatched receive packet from the default receive queue to the default buffer.

14. The system according to claim 11, wherein
the adapter processor is further configured to send to the physical device driver of the IO container an interrupt indicating that the filter receive queue assigned to the matching packet filter has the one or more filter-matched receive packets or the default receive queue has one or more unmatched receive packets; and
the physical device driver is further configured to count the one or more filter-matched receive packets and to transfer the one or more filter-matched receive packets as a group to the OS specific interface with an indication that the group of the filtered-matched receive packets are from the filter receive queue assigned to the matching packet filter, upon receiving the interrupt.

15. The system according to claim 14, wherein the VBS is further configured to determine whether the OS specific interface has received the group of the filter-matched receive packets or a single filter-matched receive packet, and in response to the OS specific interface has received the group of the filter-matched receive packets, determine, based on one of the filtered-matched receive packets, to which one of the plurality of virtual interfaces to send the group of the filter-matched receive packets.

16. A system according to claim 15, wherein:
the virtual operating system associated with the matching packet filter includes a virtual driver;
the VBS is further configured to send the group of the filter-matched receive packets together to the determined virtual interface, after determining the one of the plurality of virtual interfaces to send the group of the filter-matched receive packets to; and
the host processor is configured to transfer the group of the filter-matched receive packets from the determined virtual interface to the virtual driver of the virtual system associated with the matching packet filter.

17. The system according to claim 11, wherein:
the host memory including a buffer allocation pool;
wherein respective ones of the plurality of virtual operative systems are configured to transfer a filter specific buffer from a virtual driver of the respective ones of the plurality of virtual operating systems to a virtual interface of a virtual switch/bridge (VBS) of the IO container;
wherein the IO container is configured to place the filter specific buffer in the buffer allocation pool; and
wherein the IO container is further configured to allocate the filter specific buffer from the buffer allocation pool by mapping the filter specific buffer to a memory space allocated to the IO container and associated with the filter receive queue assigned to the matching filter, with the filter specific buffer is shared by the IO container and the virtual driver.

18. A system according to claim 11, wherein the adapter memory is further configured to host
a plurality of transmit queues corresponding to each of the plurality of packet filters.

19. An article of manufacture, comprising:
a tangible and non-transitory machine-readable medium;
a first plurality of instructions stored in the machine-readable medium, which, in response to execution by a network adapter of a host machine, cause the network adapter to perform operations comprising:
comparing respective ones of a plurality of receive packets with a plurality of packet filters respectively associated with a plurality of virtual operating systems sharing the network adapter and operating on the host machine to determine whether one of the packet filters matches the respective ones of the plurality of receive packets,
wherein the plurality of virtual operating systems shares the network adapter via an input output (IO) container that is separate and distinct from the network adapter,
wherein the packet filters reside in the network adapter, are correspondingly associated with the plurality of virtual operating systems, and are based on media access control (MAC) addresses of the plurality of virtual operating systems;
in response to a determination that one of the packet filters matches one or more matching ones of the plurality of receive packets, placing the one or more matching receive packet into a filter receive queue assigned to the matching packet filter; and
transferring the one or more matching receive packets from the filter receive queue to a buffer residing in the IO container, wherein the buffer is associated with one of the plurality of virtual operating systems corresponding to the matched packet filter and managed by a physical device driver of the IO container; and
a second plurality of instructions stored in the machine-readable medium, which, in response to execution by the physical device driver of a host machine, cause the physical device driver to perform operations comprising:
counting the one or more matching receive packets from the filter receive queue; and
transferring the one or more matching receive packets as a group of receive packets to a physical interface of a virtual switch/bridge (VBS) with an indication indicating that the group of receive packets are from the filter receive queue assigned to the matching packet filter; and
prior to the counting, examining a received interrupt signal from the network adapter to determine that the one or more matching receive packets are from the filter receive queue assigned to the matching packet filter.

20. The article according to claim 19, wherein the operations further comprise:
in response to the matching packet filter not found, placing the one receive packet into a default receive queue.

* * * * *